US011321015B2

(12) United States Patent
Borich

(10) Patent No.: US 11,321,015 B2
(45) Date of Patent: May 3, 2022

(54) AGGRESSIVE INTENT WRITE REQUEST CANCELLATION

(71) Applicant: INTERNATIONAL BUSINESS MACHINES CORPORATION, Armonk, NY (US)

(72) Inventor: Franco Vincent Borich, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/856,376

(22) Filed: Apr. 23, 2020

(65) Prior Publication Data

US 2021/0334040 A1 Oct. 28, 2021

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01)
(58) Field of Classification Search
CPC ....... G06F 3/0659; G06F 3/067; G06F 3/0604
See application file for complete search history.

(56) References Cited

U.S. PATENT DOCUMENTS

| 9,998,147 B1 | 6/2018 | Dubucq et al. |
| 10,282,135 B2 | 5/2019 | Gladwin et al. |
| 10,379,961 B2 | 8/2019 | Scholl et al. |
| 2014/0351659 A1* | 11/2014 | Dhuse ................ G06F 11/1092 714/47.2 |
| 2016/0255150 A1* | 9/2016 | Dhuse ................ H04L 67/1097 709/213 |
| 2018/0262565 A1* | 9/2018 | Hegde ................ H04L 67/1097 |
| 2019/0222647 A1 | 7/2019 | Dhuse |

\* cited by examiner

*Primary Examiner* — Michelle T Bechtold
(74) *Attorney, Agent, or Firm* — Randy Emilio Tejeda; Andrew D. Wright; Roberts Calderon Safran & Cole, P.C.

(57) ABSTRACT

Methods and systems for aggressive intent write request cancellation are disclosed. A method includes: generating an entry for data creation and generating a data object in view of the entry. Further, the method includes sending intent write requests to write a plurality of slices of the data object into dispersed storage (DS) units and determining whether or not a threshold number of the plurality of slices have been written into the DS units. Additionally, the method includes canceling at least one queued intent write request of the intent write requests corresponding to at least one unwritten slice of the plurality of slices in response to determining that the threshold number of the plurality of slices have been written into the DS units.

18 Claims, 7 Drawing Sheets

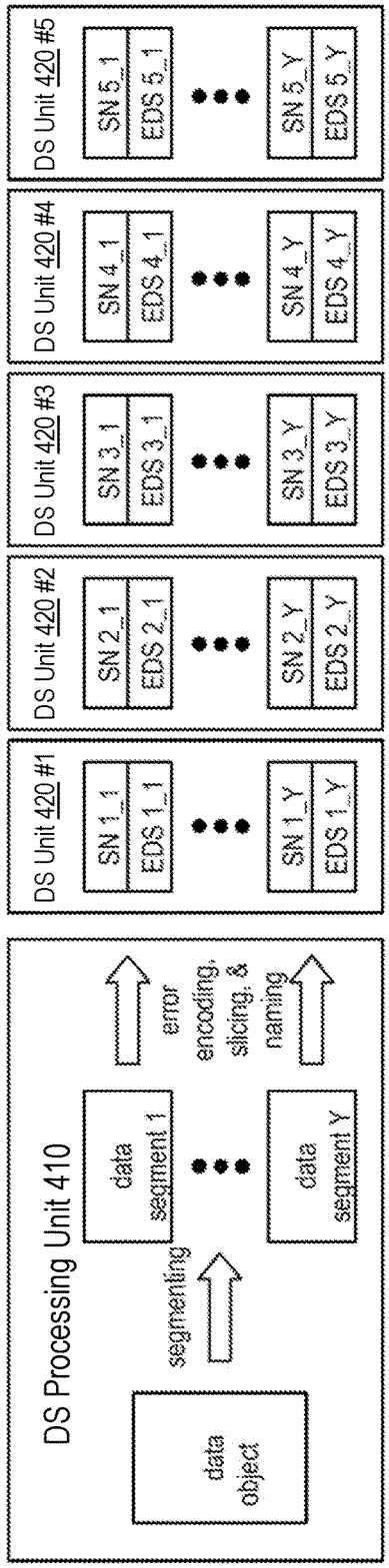
FIG. 5
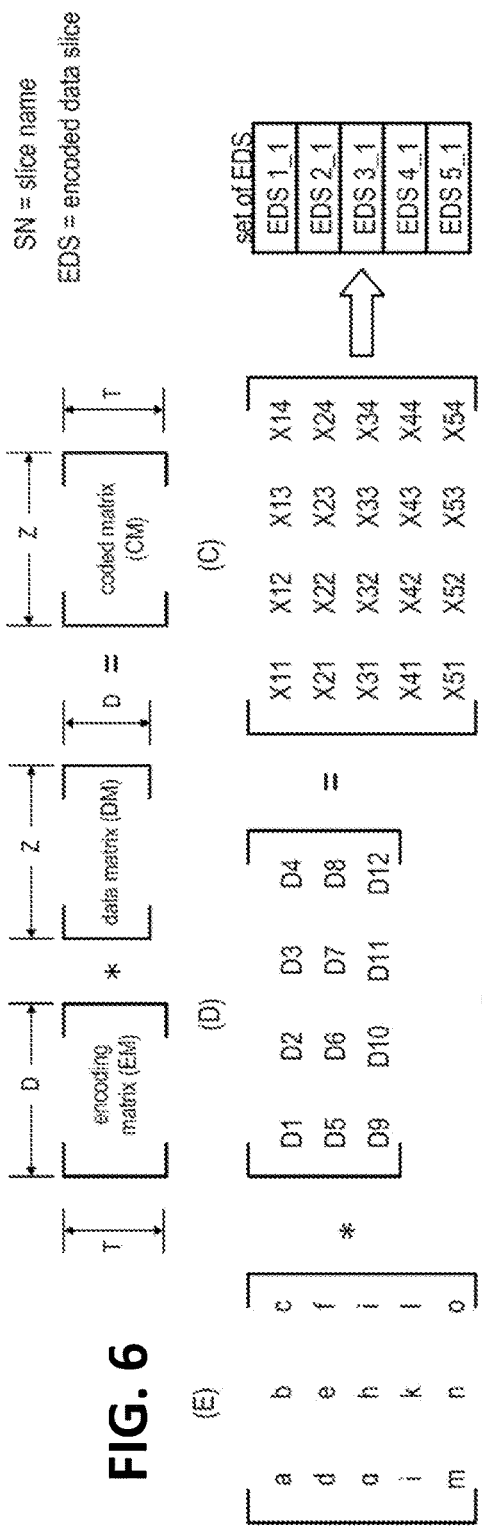
FIG. 6
FIG. 7
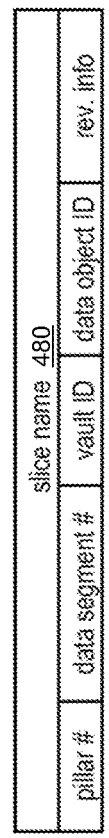
FIG. 8

AGGRESSIVE INTENT WRITE REQUEST CANCELLATION

BACKGROUND

Aspects of the present invention generally relate to computing devices and, more particularly, to methods and systems for aggressive intent write request cancellation.

Computing devices communicate data, process data, and/or store data. Such computing devices range from wireless smart phones, laptops, tablets, personal computers (PCs), work stations, and video game devices, to data centers that support millions of web searches, stock trades, or online purchases every day. Computing devices typically include a central processing unit (CPU), a memory system, user input/output interfaces, peripheral device interfaces, and an interconnecting bus structure.

A computing device may effectively extend its CPU by using cloud computing to perform one or more computing functions (e.g., a service, an application, an algorithm, an arithmetic logic function, etc.) on behalf of the computing device. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Further, for large services, applications, and/or functions, cloud computing may be performed by multiple cloud computing resources in a distributed manner to improve the response time for completion of the service, application, and/or function. For example, Hadoop® (a registered trademark of The Apache Software Foundation) is an open source software framework that supports distributed applications enabling application execution by thousands of computers. Network storage is a computing capability that is typically offered by cloud computing providers. In particular, a user of cloud computing services may store and retrieve data on cloud infrastructure maintained by a cloud computing provider, such as a dispersed storage (DS) or dispersed storage network (DSN) system. A computer may use cloud storage as part of its memory system. Cloud storage enables a user, via a computer, to store files, applications, etc., on an Internet storage system. The Internet storage system may include a redundant array of independent disks (RAID) system and/or a dispersed storage system (dispersed storage network memory) that uses an error correction scheme to encode data for storage.

SUMMARY

In a first aspect of the invention, there is a method that includes: generating, by a computing device, an entry for data creation; generating, by the computing device, a data object in view of the entry; sending, by the computing device, intent write requests to write a plurality of slices of the data object into dispersed storage (DS) units; determining, by the computing device, whether or not a threshold number of the plurality of slices have been written into the DS units; and canceling, by the computing device, at least one queued intent write request of the intent write requests corresponding to at least one unwritten slice of the plurality of slices in response to determining that the threshold number of the plurality of slices have been written into the DS units.

In another aspect of the invention, there is a computer program product that includes one or more computer readable storage media having program instructions collectively stored on the one or more computer readable storage media. The program instructions are executable to: generate an entry for data creation; generate a data object in view of the entry; send intent write requests to write a plurality of slices of the data object into dispersed storage (DS) units; determine that a threshold number of the plurality of slices have not been written into the DS units; and preserve at least one queued intent write request of the intent write requests corresponding to at least one unwritten slice of the plurality of slices in response to determining that the threshold number of the plurality of slices have not been written into the DS units.

In another aspect of the invention, there is a system that includes: a processor, a computer readable memory, one or more computer readable storage media, and program instructions collectively stored on the one or more computer readable storage media. The program instructions are executable to: generate an entry for data creation; generate a data object in view of the entry; send intent write requests to write a plurality of slices of the data object into dispersed storage (DS) units; determine whether or not a threshold number of the plurality of slices have been written into the DS units; and cancel at least one queued intent write request of the intent write requests corresponding to at least one unwritten slice of the plurality of slices in response to a determining that the threshold number of the plurality of slices have been written into the DS units.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 is a schematic block diagram of an example of dispersed storage error encoding of data in accordance with aspects of the present invention.

FIG. 6 is a schematic block diagram of a generic example of an error encoding function in accordance with aspects of the present invention.

FIG. 7 is a schematic block diagram of a specific example of an error encoding function in accordance with aspects of the present invention.

FIG. 8 is a schematic block diagram of an example of a slice name of an encoded data slice (EDS) in accordance with aspects of the present invention.

DETAILED DESCRIPTION

Figure 1:
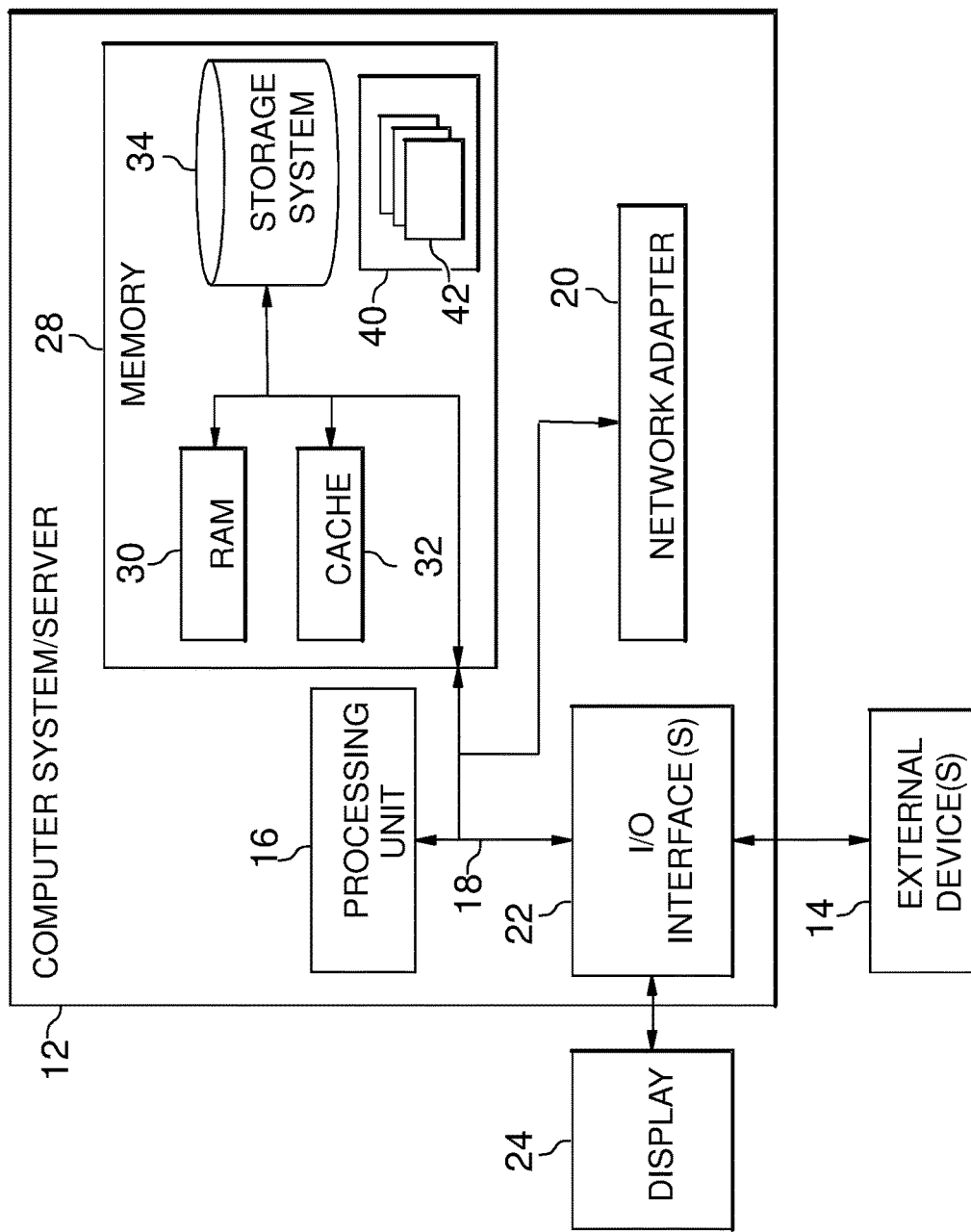
FIG. 1 depicts a cloud computing node according to an embodiment of the present invention.

Aspects of the present invention generally relate to computing devices and, more particularly, to methods and systems for aggressive intent write request cancellation. As described herein, aspects of the invention include a method and system which immediately cancel queued up intent write requests to dispersed storage (DS) units in response to satisfying a configured threshold number of successful responses for written slices within a number of DS units. In embodiments, discarding these intent write requests allows for a DS processing unit to hang onto (preserve) longer-lived user data. In this manner, implementations of the invention reduce processing overhead in a dispersed storage network (DSN) memory by reducing a load for any overwhelmed DS unit and reducing an amount of future work for a rebuilder module of the DS processing unit.

Intent log entries are often short lived because of their deletion in response to satisfying a threshold number of successful responses from a number of DS units. In this way, there may be a deletion of intent write requests before data slices are written to slower DS units. Accordingly, there is a writing, deleting, and rebuilding of intent log entries which are no longer available, resulting in an additional burden on DS processing unit and DS unit resources. This additional burden may result in reliability issues with the DS processing unit and/or DS units.

Additionally, if a DS unit enters a slow or an impaired state (e.g., due to heavy resource usage), the DS processing unit may queue the intent write requests for this impaired DS unit until there is an exhaustion of available resources on the DSN processing unit. In response to this resource exhaustion, the DS processing unit sheds (drops/deletes) the intent write requests in view of pressure on the DSN memory. However, shedding the intent write requests generates an additional cost later for the DS processing unit. For example, shedding the intent write requests results in an increased burden on the rebuilder module by increasing missing slices and/or slices which need rebuilding, thereby causing further reliability issues for the DSN memory.

In addition, deletion of the short lived write intent objects occurs after the intent write requests are queued and ready to be sent to the impaired DS unit. Accordingly, sending these queued intent write requests after deletion of the intent log entry results in a waste of resources for both the DS processing unit and the slow or impaired DS unit, thereby exacerbating the problem for the slow or impaired DS unit and preventing a timely recovery for the impaired DS unit. Further, sending these queued intent write requests also prevents the DS processing unit from preserving relatively longer-lived outstanding user data, thereby increasing future work for the rebuilder module.

In embodiments, there is a method for intent write cancellation in a DSN memory, with the method including a step of writing an intent object associated with a data write request to an internal intent log within the DSN system. Additionally, the method includes the step of monitoring the internal intent log to determine if the object write has met a predetermined threshold number of successful responses. Further, if the predetermined threshold number of successful responses is exceeded, the method includes the step of cancelling pending intent log data associated with the data write request, while still retaining the pending user data write requests until a memory utilization threshold is exceeded.

Embodiments address problems with inherent overhead from intent logs within the DSN memory. In embodiments, the methods and systems described herein reduce this overhead by treating outstanding short-lived intent log data differently than longer-lived outstanding user data. In embodiments, treating the short-lived intent log data differently includes immediately cancelling any queued intent write requests in response to a satisfaction of a configured threshold number of successful responses for writing data slices to a number of DS units. Canceling the intent write requests allows for the DS processing unit to hang onto (preserve) long-lived user data and reduce future work for a rebuilder module of the DS processing unit and also reduce a load on any overwhelmed DS unit. In this way, DS processing unit improves upon load shedding by treating outstanding intent log data (short-lived) differently than outstanding user data (long-lived). Accordingly, embodiments improve the functioning of a computer by reducing this overhead by immediately canceling queued up intent write requests instead of waiting for an exhaustion of almost all of the available resources of the DSN memory. Additionally, implementations of the invention use techniques that are, by definition, rooted in computer technology (e.g., DSNs, DS processing units, DS units, cloud computing, and canceling queued up intent write requests to DS units in response to satisfying a configured threshold number of successful responses from a number of DS units).

It should be understood that, to the extent implementations of the invention collect, store, or employ personal information provided by, or obtained from, individuals (for example, long-lived outstanding user data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
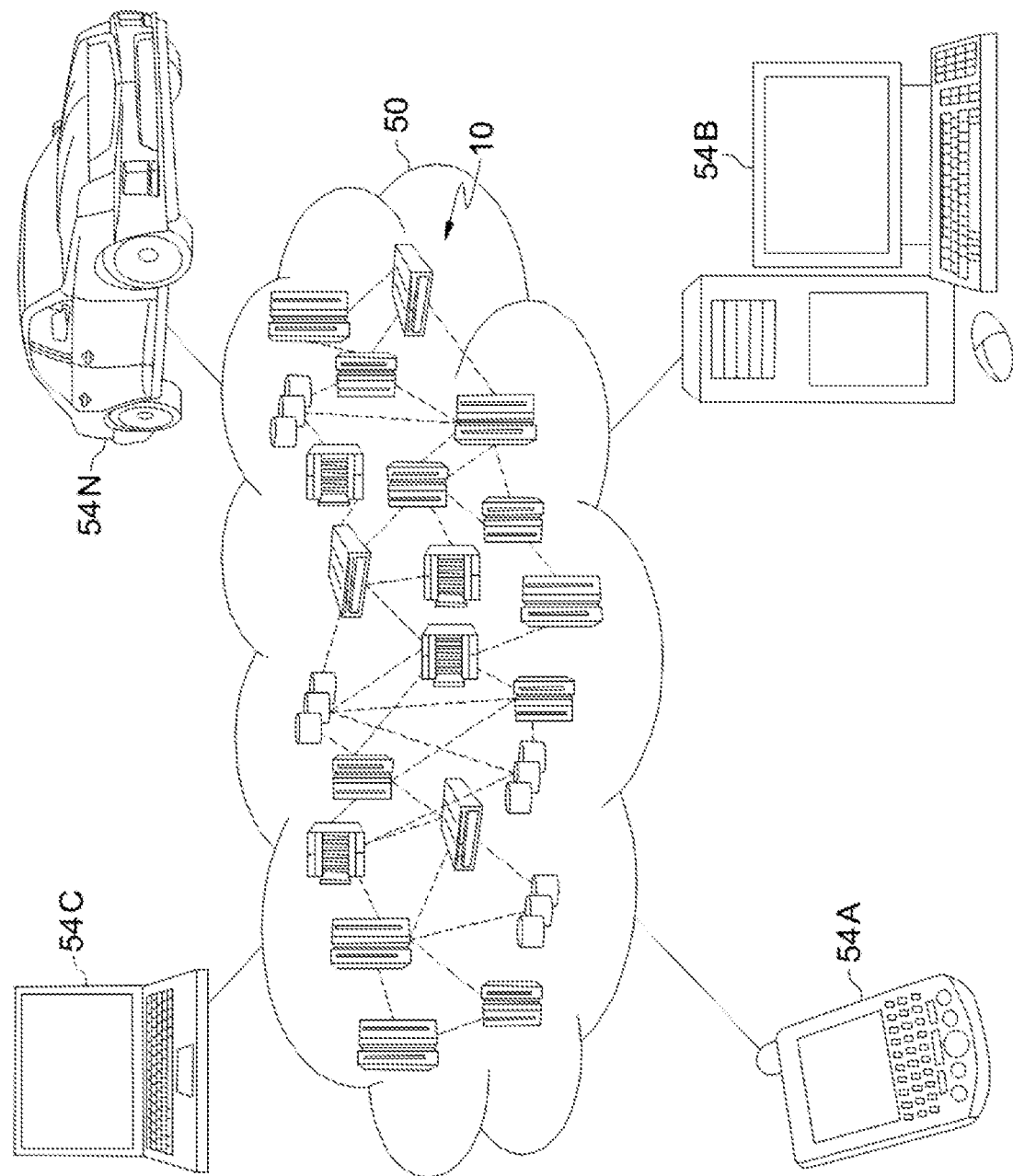
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
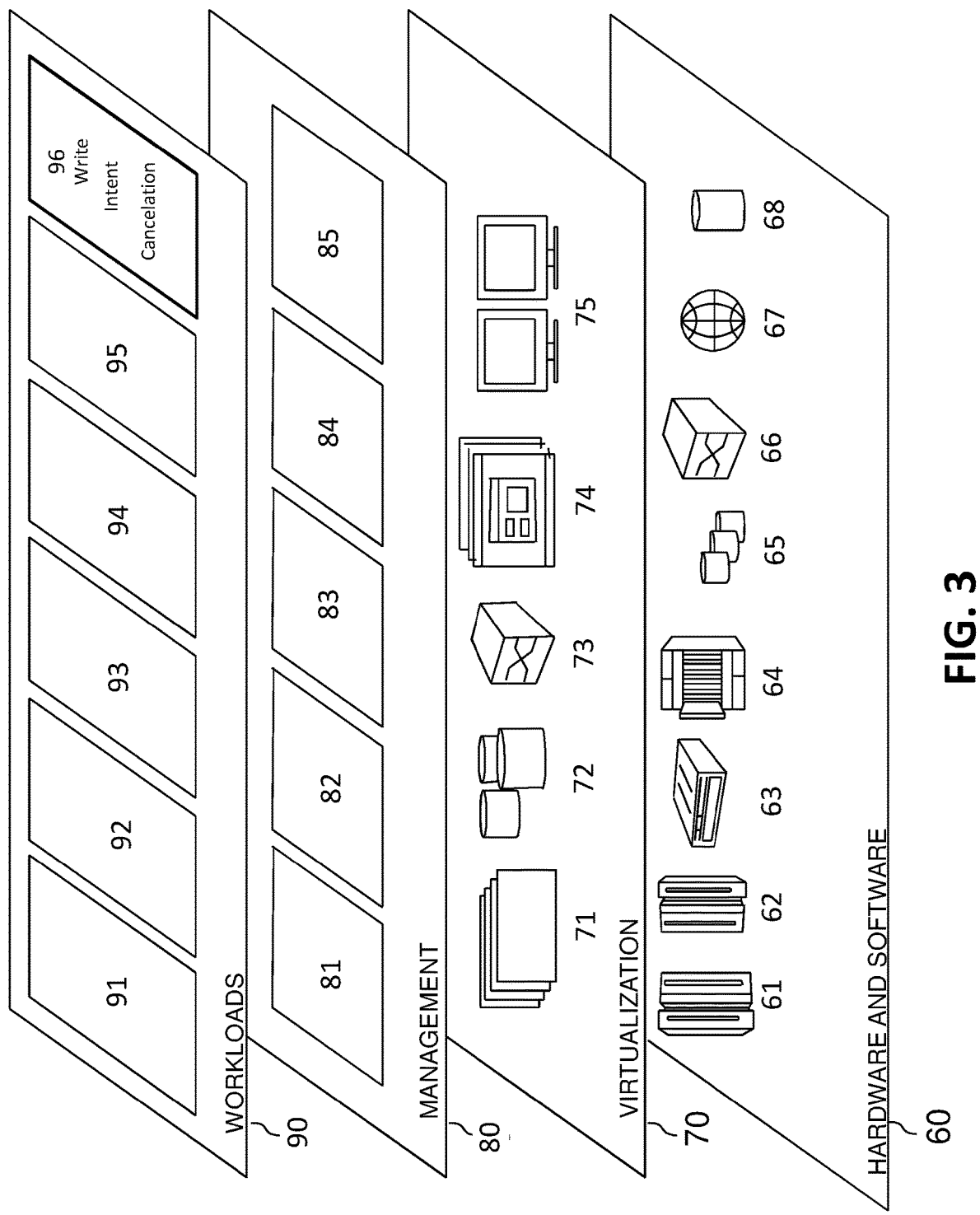
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and write intent cancelation 96.

Implementations of the invention may include a computer system/server 12 of FIG. 1 in which one or more of the program modules 42 are configured to perform (or cause the computer system/server 12 to perform) one of more functions of the write intent cancelation 96 of FIG. 3. For example, the one or more of the program modules 42 may be configured to: determine a satisfaction of a configured threshold number of successful responses for write intent objects from a number of DS units; in response to satisfying the threshold, canceling any queued intent write requests; and preserve long-lived outstanding user data. Other functionalities of the program modules 42 are described further herein such that the program modules 42 are not limited to the functions described above. Moreover, it is noted that some of the program modules 42 can be implemented within the infrastructure shown in FIGS. 1-4. For example, the program modules 42 may be representative of a DS processing unit program module 415 and a DS unit program module 425 as shown in FIG. 4.

Figure 4:
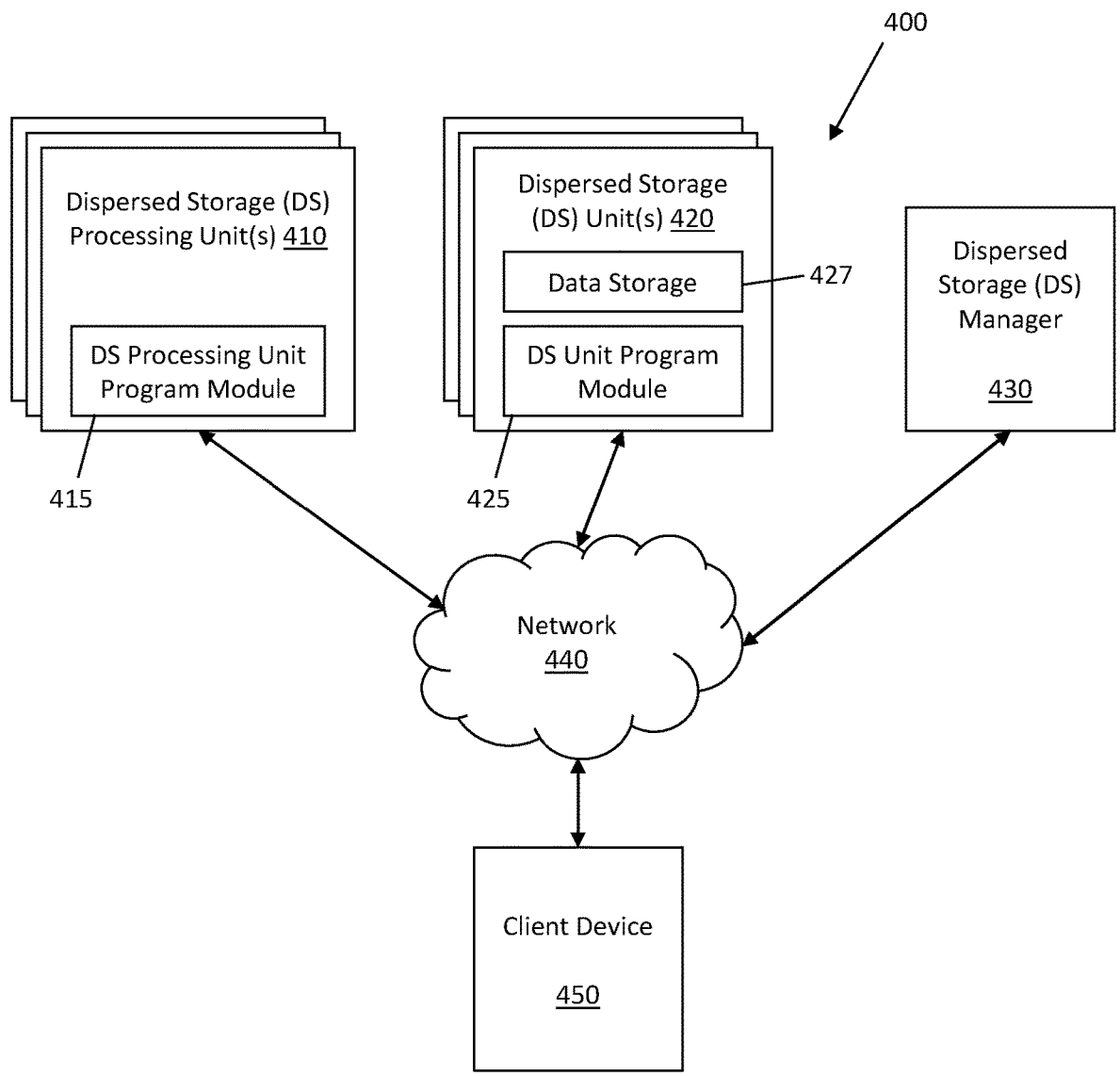
FIG. 4 shows a dispersed storage network (DSN) in accordance with aspects of the invention.

FIG. 4 shows a dispersed storage network 400 (referred to as DSN or dsNet) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG. 2, and each of the DS processing units 410, the DS units 420, and the DS manager 430 are nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates "extra" slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

According to aspects of the invention, the DS processing units 410 are configured to encrypt and encode data during a write operation, to manage the dispersal of slices of data during a write operation, and to decode and decrypt data during a read operation. In one example, during a write operation, one or more of the DS processing units 410 are configured to generate data slices for storage by performing a dispersed storage error encoding function on a set of data segments for storage, where the encoded data slices of a data segment are transmitted to an information dispersal algorithm (IDA) width threshold number of DS units 420. In this example, during a read operation, one or more of the DS processing units 410 are configured to recover a data segment by retrieving at least an IDA decode threshold number of encoded data slices from at least a corresponding IDA decode threshold number of DS units 420, and by performing a dispersed storage error decoding function on the received encoded data slices.

In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

In embodiments, each DS processing unit 410 comprises a DS processing unit program module 415 that is configured to perform processes of the DS processing unit 410 as described herein, e.g., encrypt and encode data during a write operation, manage the dispersal of slices of data during a write operation, decode and decrypt data during a read operation, and immediately cancel queued up intent write requests to DS units in response to satisfying a configured threshold number of successful responses for intent objects from a number of DS units, etc. The DS processing unit program module 415 may comprise one or more program modules 42 as described with respect to FIG. 1.

According to aspects of the invention, the DS units 420 are configured to store the data slices that are received from a DS processing unit 410 during a write, and to return data slices to a DS processing unit 410 during a read. Each DS unit 420 may comprise a physical device (e.g., a computer device such as a computer system/server 12 of FIG. 1), a virtual machine (VM), or a container (e.g., a Docker container).

In embodiments, each DS unit 420 comprises DS unit program module 425 and data storage 427. The DS unit program module 425 may comprise one or more program modules 42 as described with respect to FIG. 1, and is configured to perform processes of the DS unit 420 as described herein, e.g., store data slices that are received from a DS processing unit 410 during a write, return data slices to a DS processing unit 410 during a read, perform compaction of data in the data storage 427, etc.

In embodiments, the data storage 427 receives and stores data in accordance with instructions received from the DS unit program module 425. The data storage 427 is one or more of any type or combination of types of data storage medium, data storage device, or system (e.g., storage device 65 of FIG. 3) and is located on (or is accessible to) the DS unit 420. For example, the data storage 427 may include one or more hard drives, Shingled Magnetic Recording (SMR) drives, solid state drives (SSDs), Tape Drives, and other memory devices.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT) writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

FIGS. 5-10 illustrate an exemplary operation of the DSN 400. FIG. 5 is a schematic block diagram of an example of dispersed storage error encoding of data. When a DS processing unit 410 has data to store, it disperse storage error encodes the data in accordance with a dispersed storage error encoding process based on dispersed storage error encoding parameters. Here, the computing device stores a data object, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 6 and a specific example is shown in FIG. 7); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the DS processing unit 410 divides data object into a plurality of fixed sized data segments (e.g., 1 through Y of a fixed size in range of kilobytes to terabytes or more). The number of data segments created is dependent of the size of the data and the data segmenting protocol.

The DS processing unit 410 then disperse storage error encodes a data segment using the selected encoding function (e.g., Cauchy Reed-Solomon) to produce a set of encoded data slices. FIG. 6 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 7 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 5, the computing device also creates a slice name (SN) for each encoded data slice (EDS) in the set of encoded data slices. A typical format for a slice name 480 is shown in FIG. 8. As shown, the slice name (SN) 480 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory.

As a result of encoding, the DS processing unit 410 produces a plurality of sets of encoded data slices, which are provided with their respective slice names to the storage units (DS unit 420 numbers one through five in this example) for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 9:
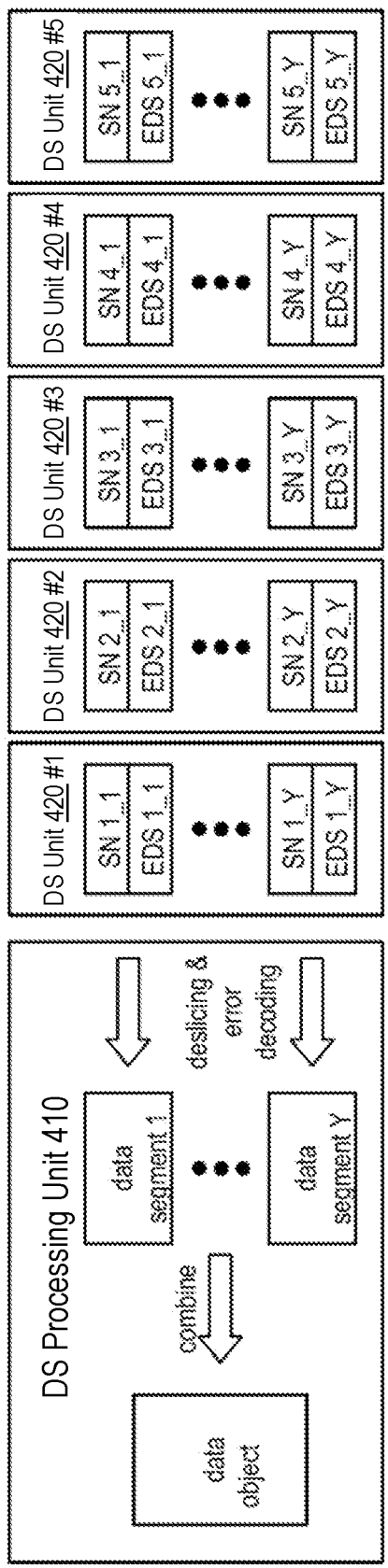
FIG. 9 is a schematic block diagram of an example of dispersed storage error decoding of data in accordance with aspects of the present invention.

FIG. 9 is a schematic block diagram of an example of dispersed storage error decoding of a data object that was dispersed storage error encoded and stored in the example of FIG. 6. In this example, the DS processing unit 410 retrieves from the storage units at least the decode threshold number of encoded data slices per data segment. As a specific example, the computing device retrieves a read threshold number of encoded data slices.

Figure 10:
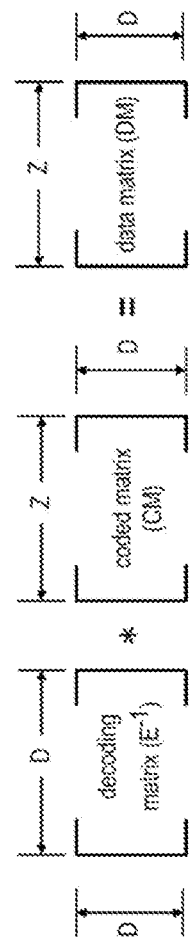
FIG. 10 is a schematic block diagram of a generic example of an error decoding function in accordance with aspects of the present invention.

To recover a data segment from a decode threshold number of encoded data slices, the computing device uses a decoding function as shown in FIG. 10. As shown, the decoding function is essentially an inverse of the encoding function of FIG. 6. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 11:
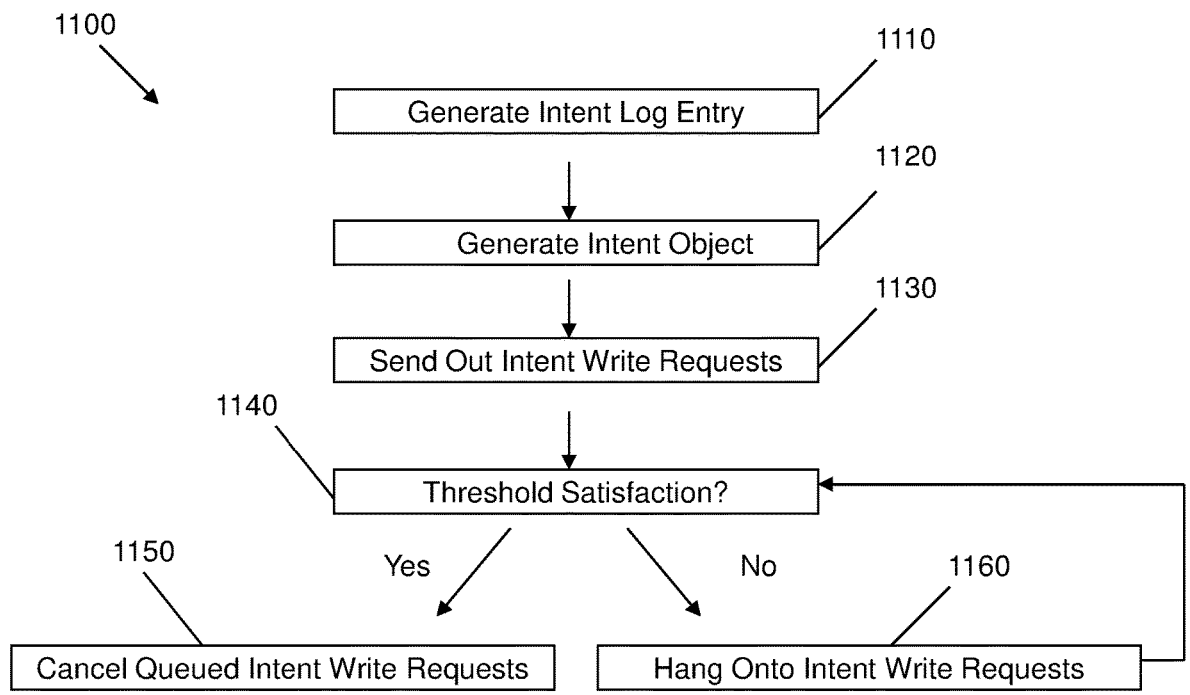
FIG. 11 depicts a flowchart of an exemplary method for aggressive intent write request cancellation performed in accordance with aspects of the invention.

FIG. 11 depicts a flowchart 1100 of an exemplary method for immediately canceling queued up intent write requests to dispersed storage (DS) units in response to satisfying a configured threshold number of successful responses from a number of DS units. The method of FIG. 11 is performed by DS processing unit program module 415 of the DS processing unit 410 in accordance with aspects of the invention. The steps of the method are performed in the environment of FIG. 4 and are described with reference to the elements shown in FIG. 4. At step 1110, the DS processing unit program module 415 of the DS processing unit 410 generates an intent log entry within an intent log. In one example, an intent log is a record listing operations, e.g., creating data objects, caching data objects, etc.

In embodiments, the operations are written as intent log entries having an intent for writing data to the DSN memory in a single operation. Accordingly, use of intent logs adds an amount of operational overhead to the DSN memory by using processing power to write intent log entries and reviewing the intent log entries to ensure operations are complete. At step 1110, the DS processing unit program module 415 generates the intent log entry by writing the intent into the record of the DS processing unit 410. In one example, the intent is an instruction to generate an intent object. In embodiments, an intent object is a data object.

At step 1120 and as described with respect to FIGS. 4-10, the DS processing unit program module 415 of the DS processing unit 410 generates the intent objects in view of the intent log. In embodiments, generating the intent object involves a sequence which includes writing new data to the DS units 420 of the DSN 400 to generate the intent object, updating a name index by writing an entry into the index with the name of the intent object, and writing metadata of the intent object, amongst other examples. In this way, the intent objects include metadata, which represent descriptive features of the intent object. Examples of the metadata include a size of the intent object, a time of creation, and a name for the metadata, amongst other examples. In embodiments, a name index is a record within the intent log which indicates a name for the operation. In one example, an entry is "object 10" into the name index, amongst other examples At step 1130 and as described with respect to FIGS. 4-10, the DS processing unit program module 415 of the DS processing unit 410 sends out intent write requests for writing encoded data slices of the intent object to the DS units 420 of the DSN 400. In embodiments, by dividing the intent object into slices and storing the slices at plural different DS units 420, the DSN 400 ensures that no single one of the DS units 420 has all the slices that are necessary to recreate the data object. Accordingly, in view of a failure event, the slices written in the DS units 420 recreate the intent objects in view of the intent log entries of the intent log.

At step 1140 and as described with respect to FIGS. 4-10, the DS processing unit program module 415 of the DS processing unit 410 determines whether there is a satisfaction of a threshold number of successful responses with respect to the intent write requests. In embodiments, a successful response includes a writing of slices of the intent object into the subset of DS units of the DS units 420. In embodiments, in order to make a determination of threshold satisfaction, the DS processing unit 410 receives a number of write confirmations indicating the successful response from the subset of DS units of the DS units 420. In one example, the threshold number for successful responses is set at eight successful responses out of 10 possible write confirmations. A satisfaction of the threshold in this example is the DS processing unit 410 receiving nine write confirmations from the subset of DS units of the DSN units 420. Alternatively, in making a determination of a non-satisfaction of the threshold, the DS processing unit 410 receives less than the set threshold of write confirmations. In view of the previous example, the DS processing unit 410 receives seven write confirmations, which is less than the threshold number of responses set at eight write confirmations. In embodiments, the subset of DS units of the DS units 420 is with respect to a geographical location within the DSN 400. In another example, the subset DS units of the DS units 420 is with respect to specific computing hardware within the DSN 400.

In an example, the subset of DS units includes 10 DS units 420 all located within a geographical location of the DSN 400. A satisfaction of the threshold number of successful responses includes writing slices into eight out of the 10 DS units 420. In this example, the threshold is set at 70% of the subset DS units of the DS units 420 having the slices. Accordingly, the DS processing unit program module 415 determines there is a satisfaction of the threshold in view of the amount of successful responses exceeding the threshold of 70%. The remaining two DS units which lack the encoded data slice are either slower than the other eight DS units 420 or impaired and therefore lack the encoded data slice. Accordingly, the DS processing unit program module 415 queues these intent write requests for these slower or impaired DS units of the DS units 420.

In embodiments, the flowchart 1100 moves onto either step 1150 in response to meeting the threshold or onto step 1160 in response to not meeting the threshold. At step 1150 and as described with respect to FIGS. 4-10, the DS processing unit program module 415 cancels or drops any queued up intent write requests with respect to the slow or impaired DS units of the DS units 420. Alternatively, at step 1160 and as described with respect to FIGS. 4-10, the DS processing unit program module 415 hangs onto (preserve) the intent write requests until the DS units 420 satisfy the threshold number of successful responses at step 1140.

In embodiments, the DS processing unit program module 415 reduces processing overhead of the DSN 400 by immediately canceling or dropping the queued intent write requests in view of satisfying the threshold, instead of waiting for consumption of most of a resource pool of the DSN 400. For example, two DS units of the DS units 420 have queued intent write requests in view of satisfying the threshold. In response to the satisfaction of the threshold, the DS processing unit program module 415 cancels or drops these queued intent write requests of the slow or impaired DS units of the DS units 420. In this way, the DS processing unit program module 415 implements an aggressive intent write cancelation by canceling or dropping queued intent write requests, even when the resource pool is not full.

In embodiments, in addition to reducing the inherent overhead, canceling or dropping the queued intent write requests reduces an amount of work for a rebuilder module of DS processing unit 410. In embodiments, the rebuilder module is a background agent which checks a state of each DS unit of the DS units 420 to ensure that all the DS units 420 have slices to rebuild the intent object. Accordingly, canceling or dropping the queued intent write requests reduces an amount of slices which need rebuilding, thereby reducing a burden on the rebuilder module of the DS processing unit 410.

In embodiments, in addition to canceling or dropping queued intent write requests, the DS processing unit program module 415 preserves longer-lived user data. In one example, the longer-lived user data represents any data which is not from an intent log entry. In a further example, the user data is data the user writes into the DS units 420, e.g., an audio file. In embodiments, the intent log entry is shorter-lived because of a shorter life cycle of the intent log entry, which includes writing the intent object and deleting the intent log entry after writing the intent object. In comparison, the user data is written directly into the DS units 420 and is not subject to immediate deletion in response to writing the user data. In this way, the DS processing unit program module 415 preserves the user data by not immediately deleting the user data in response to writing the data. Accordingly, the user data has a longer life cycle than the intent log entry. In this way, the user data is much longer-lived than the intent log entry. In embodiments, the DS processing unit program module 415 maintains the longer-lived user data until a resource pool utilization threshold is met.

In embodiments, a resource pool utilization threshold is a number of DS units out of the DS units which the DSN 400 utilizes. In one example, there are 10 DS units 420, and the DSN is utilizing eight DS units of the 10 DS units 420. In this example, the resource pool utilization threshold is at 80%. In view of satisfying the resource pool utilization threshold, the DS processing unit program module 415 deletes or discards the longer-lived user data. In this way, the DS processing unit program module 415 allows for a maintenance of longer-lived user data, while reducing intent log overhead, thereby preventing reliability issues for the DSN memory.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   generating, by a computing device, an entry for data creation;
   generating, by the computing device, a data object in view of the entry;
   sending, by the computing device, intent write requests to write a plurality of slices of the data object into dispersed storage (DS) units;
   determining, by the computing device, whether or not a threshold number of the plurality of slices have been written into the DS units;
   canceling, by the computing device, at least one queued intent write request of the intent write requests corresponding to at least one unwritten slice of the plurality of slices in response to determining that the threshold number of the plurality of slices have been written into the DS units;
   preserving user data written into the DS units until a resource pool utilization threshold is met;
   separating the data object into the plurality of slices using a combination of erasure coding, encryption, and Information Dispersal Algorithms (IDAs); and
   generating extra slices for the data object, wherein:
      the canceling the at least one queued intent write request reduces a burden on a rebuilder module of a DS processing unit,
      the rebuilder module is a background agent which checks a state of each DS unit of the DS units for rebuilding the data object,
      the burden is reduced on the rebuilder module by reducing an amount of the plurality of slices which need rebuilding,
      the resource pool utilization threshold is a number of the DS units utilized,
      the at least one unwritten slice is a dispersed piece of encoded data used to recreate the data object, and
      the data object is recreated from a subset of a total number of slices which includes the plurality of slices and the extra slices.

2. The method of claim 1, wherein the entry is an intent log entry that is an intent to generate the data object.

3. The method of claim 1, wherein the determining that the threshold number of the plurality of slices have been written into the DS units includes receiving a threshold number of write confirmations indicating a slice is written into the DS units.

4. The method of claim 1, further comprising determining that the threshold number of the plurality of slices have not been written into the DS units by receiving, by the computing device, a number of write confirmations less than a threshold number of write confirmations indicating a slice is written into the DS units.

5. The method of claim 1, further comprising, receiving, by the computing device, the user data which is written into the DS units by a user and separate from the entry.

6. The method of claim 5, wherein preserving the user data is in response to the user data being written into the DS units.

7. The method of claim 1, further comprising preserving the intent write requests for unwritten slices in response to determining that the threshold number of the plurality of slices have not been written into the DS units.

8. A computer program product comprising one or more computer readable storage media having program instructions collectively stored on the one or more computer readable storage media, the program instructions executable to:
   generate an entry for data creation;
   generate a data object in view of the entry;
   send intent write requests to write a plurality of slices of the data object into dispersed storage (DS) units;
   determine that a threshold number of the plurality of slices have not been written into the DS units;
   preserve at least one queued intent write request of the intent write requests corresponding to at least one unwritten slice of the plurality of slices in response to determining that the threshold number of the plurality of slices have not been written into the DS units; and
   in response to determining that the threshold number of the plurality of slices have been written into the DS units, cancel the at least one queued intent write request
   preserve user data written into the DS units until a resource pool utilization threshold is met;
   separate the data object into the plurality of slices using a combination of erasure coding, encryption, and Information Dispersal Algorithms (IDAs); and
   generate extra slices for the data object, wherein:
      the canceling the at least one queued intent write request reduces a burden on a rebuilder module of a DS processing unit, the rebuilder module is a background agent which checks a state of each DS unit of the DS units for rebuilding the data object, the burden is reduced on the rebuilder module by reducing an amount of the plurality of slices which need rebuilding, the resource pool utilization threshold is a number of the DS units utilized, the at least one unwritten slice is a dispersed piece of encoded data used to recreate the data object, and the data object is recreated from a subset of a total number of slices which includes the plurality of slices and the extra slices.

9. The computer program product of claim 8, wherein the entry is an intent log entry.

10. The computer program product of claim 8, wherein the entry is an intent to generate the data object.

11. The computer program product of claim 8, further comprising program instructions to discard the user data in response to a satisfaction of the resource pool utilization threshold.

12. The computer program product of claim 8, wherein the user data lives longer than the entry.

13. A system comprising:

a processor, a computer readable memory, one or more computer readable storage media, and program instructions collectively stored on the one or more computer readable storage media, the program instructions executable to:

generate an entry for data creation;

generate a data object in view of the entry;

send intent write requests to write a plurality of slices of the data object into dispersed storage (DS) units;

determine whether or not a threshold number of the plurality of slices have been written into the DS units;

cancel at least one queued intent write request of the intent write requests corresponding to at least one unwritten slice of the plurality of slices in response to a determining that the threshold number of the plurality of slices have been written into the DS units preserve user data written into the DS units until a resource pool utilization threshold is met;

separate the data object into the plurality of slices using a combination of erasure coding, encryption, and Information Dispersal Algorithms (IDAs); and generate extra slices for the data object, wherein:

the canceling the at least one queued intent write request reduces a burden on a rebuilder module of a DS processing unit, the rebuilder module is a background agent which checks a state of each DS unit of the DS units for rebuilding the data object, the burden is reduced on the rebuilder module by reducing an amount of the plurality of slices which need rebuilding, the resource pool utilization threshold is a number of the DS units utilized, the at least one unwritten slice is a dispersed piece of encoded data used to recreate the data object, and the data object is recreated from a subset of a total number of slices which includes the plurality of slices and the extra slices.

14. The system of claim 13, wherein the determining that the threshold number of the plurality of slices have been written into the DS units includes receiving a threshold number of write confirmations indicating a slice is written into the DS units.

15. The system of claim 13, wherein the user data written into the DS units is written by a user.

16. The system of claim 13, further comprising program instructions to discard the user data written into the DS units by a user in response to satisfying a resource pool utilization threshold of the DS units.

17. The system of claim 16, wherein the user data is separate from the entry and has a longer life cycle than the entry.

18. The system of claim 13, further comprising program instructions to preserve the intent write requests for unwritten slices in response to determining that the threshold number of the plurality of slices have not been written into the DS units.

* * * * *